United States Patent [19]

Everett et al.

[11] Patent Number: 5,982,293
[45] Date of Patent: Nov. 9, 1999

[54] TRANSACTION RECOVERY IN A VALUE TRANSFER SYSTEM

[75] Inventors: David Barrington Everett, Brighton; Timothy Philip Richards, Basingstoke, both of United Kingdom

[73] Assignee: Mondex International Limited, London, United Kingdom

[21] Appl. No.: 08/945,582

[22] PCT Filed: May 14, 1996

[86] PCT No.: PCT/GB96/01146

§ 371 Date: Jan. 27, 1988

§ 102(e) Date: Jan. 27, 1988

[87] PCT Pub. No.: WO96/36947

PCT Pub. Date: Nov. 21, 1996

[30] Foreign Application Priority Data

May 15, 1995 [GB] United Kingdom .................. 9509762
May 15, 1995 [GB] United Kingdom .................. 9509763
May 15, 1995 [GB] United Kingdom .................. 9509766

[51] Int. Cl.$^6$ ........................................ G06F 7/04
[52] U.S. Cl. .................. 340/825.33; 395/181; 395/182; 371/32
[58] Field of Search .................. 340/825.33, 825.54; 705/41; 395/181, 182.01, 182.02, 182.03; 371/32

[56] References Cited

U.S. PATENT DOCUMENTS 5,161,231 11/1992 Iijima ........................................ 395/800

FOREIGN PATENT DOCUMENTS

| 0619564 | 10/1994 | European Pat. Off. | ........ G07B 17/00 |
| 8303018 | 9/1983 | WIPO | ............... G07F 7/10 |
| 9308545 | 4/1993 | WIPO | ............... G07F 19/00 |
| 9424673 | 10/1994 | WIPO | ............... G11C 16/06 |

Primary Examiner—Michael Horabik
Assistant Examiner—Anthony A. Asongwed
Attorney, Agent, or Firm—Volpe and Koenig, P.C.

[57] ABSTRACT

A value transfer system for transferring value in transactions between electronic purses as electronic cash has a transaction failure recovery procedure whereby a pending log stores transaction messages after they are sent. On detection of an error an interface device (IFD) can issue a payment resume command to re-send the last transaction message and resume the transaction.

5 Claims, 5 Drawing Sheets

TRANSACTION RECOVERY IN A VALUE TRANSFER SYSTEM

The invention relates to a value transfer system for cashless transactions and in particular to the recovery of failed transactions. Value transfer systems have been proposed to allow the interchange of money values between "electronic purses". Such systems are described, for example, in International Patent Publication Nos. WO 91/16691 and WO 93/08545. Tamper proof carriers such as integrated circuit cards (ICC's), otherwise known as "smart cards" incorporate microprocessors and electronic memories and carry the electronic purses. Strictly, the electronic purses are computer "applications" consisting of programs and associated data and the smart cards are one example of an application carrier device (ACD).

In order to exchange value between electronic purses the cards (ACD's) which carry the respective purses are put into communication via one or more interface devices (IFD's). For example, in loading value, or "electronic cash" into his purse from a bank, a customer would introduce his card into an automatic teller machine (ATM) associated with the bank. The ATM is an interface device which is coupled to the ACD which carries the electronic purse of the bank. The interface device (IFD) exchanges information between the purse and the required electronic cash is transferred from the bank purse to the customer purse. This is an on-line transaction as far as the bank is concerned.

Another form of interface device is a point-of-sale (POS) terminal at a retailer's outlet. Here the customer may introduce his card to the terminal, so connecting his electronic purse to that of the retailer. Goods can be purchased by transfer of electronic cash from the customer purse to the retailer purse. This is an off-line transaction as far as the bank is concerned. Remote transactions are also possible, where two purse-carrying cards are introduced to respective interface devices which communicate with each other via modems and a communication network. Thus, value can be exchanged in transactions via telephone or on the Internet, for example.

A transaction, typically for the exchange of value, consists of the exchange of a number of messages between purses in accordance with a predetermined protocol. It is possible for the message sequence to be interrupted for a number of reasons. There may be equipment failure, power loss or message corruption because of electrical noise or synchronisation difficulties, for example. Most network systems have error correction facilities at the modem level. Even so, there is potential for a transaction to fail because of interruption of the transaction message sequence. The present invention seeks to provide a system having facilities for the recovery and completion of interrupted transactions.

According to the invention there is provided a value transfer system comprising a plurality of electronic purses; a plurality of application carrier devices (ACD's) for carrying the electronic purses; and a plurality of interface devices (IFD's) for coupling together pairs of ACD's to allow value transfer transactions to take place between pairs of electronic purses, wherein a transaction between a pair of electronic purses in ACD's coupled by an IFD comprises an exchange of transaction messages in a sequence according to a predetermined protocol, each transaction message is sent from one electronic purse of a pair to the IFD and from the IFD to the other electronic purse of the pair, storage means are provided for storing transaction messages after they are sent, and the IFD is effective to invoke a recovery procedure if the predetermined sequence of transaction messages fails, the recovery procedure comprising the step of deriving from the storage means the last transaction message sent and re-sending it to resume the sequence.

Preferably each electronic purse includes a pending log which holds details of the current or latest transaction, the pending logs of the said purse pair constituting said storage means. Further, it is preferable that each electronic purse has an exception log which is a store of the details of failed transactions, the contents of the pending log being copied to a record in the exception log on failure to recover a failed transaction.

The recovery procedure may include a trial and error method, the IFD being effective when following this method to:

(a) interrogate a first electronic purse of the pair to derive from its pending log the last transaction message which it sent;
(b) send that transaction message to the other electronic purse of the pair to resume the transaction; and if this results in an error;
(c) interrogate the said other electronic purse of the pair to derive from its pending log the last transaction message which it sent; and
(d) send that transaction message to the first electronic purse of the pair to resume the transaction.

The trial and error method may result in superfluous messages being sent and in some situations it may be better to use a more structured predetermined method of recovery. In this, the IFD is effective to:

(a) interrogate both electronic purses of the pair to determine from their pending logs which electronic purse had progressed further in the failed transaction;
(b) interrogate the electronic purse which had progressed further in the failed transaction to derive from its pending log the last transaction message which it sent; and
(c) send that transaction message to the other electronic purse of the pair to resume the transaction.

Instead of, or in addition to, the storage of transaction messages in pending logs in the electronic purses, the messages may be stored after being sent in a buffer in the IFD. Then the IFD does not need to recover from the electronic purses the last message sent.

Many of the transaction failures will be transient and then preferably the IFD is effective to invoke the recovery procedure automatically and immediately in a manner transparent to the users. Sometimes, however, a transaction may be interrupted more significantly, as by removal of a card from an IFD, for example. Then a procedure for delayed recovery of transactions is necessary and a preferred arrangement is that the IFD should interrogate electronic purses at the beginning of a proposed transaction to determine whether there is a failed transaction pending between those purses which may be capable of resumption so that a delayed recovery procedure may be initiated.

The invention will further be described with reference to the accompany drawings, of which.

Figure 1:
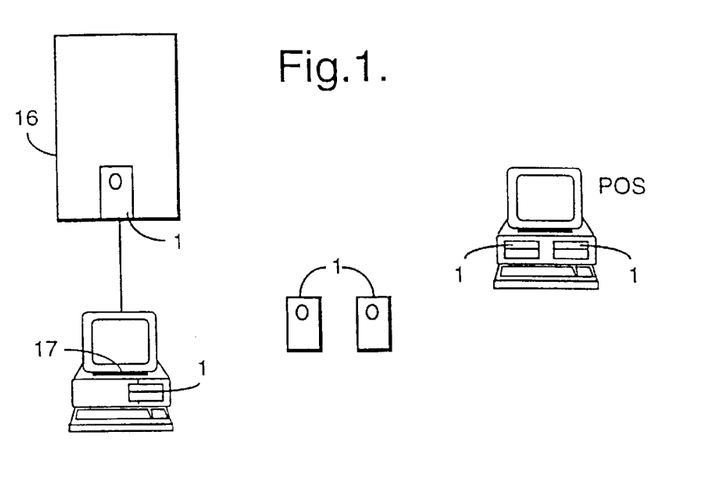
FIG. 1 is a schematic diagram of a value transfer system in accordance with the invention.
Figure 2:
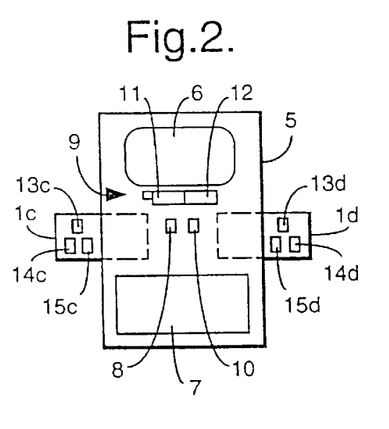
FIG. 2 is a schematic diagram of a point-of-sale terminal arrangement of the system of FIG. 1.

Referring to FIGS. 1 and 2 the value transfer system in accordance with the invention is an electronic cash system of the kind described in International Patent Publications Nos. WO 91/16691 and WO 93/08545. Each of a number of smart cards 1 is an application carrier device (ACD) which has a microprocessor, a RAM and a ROM which is of the electrically erasable programmable (EEPROM) type. Electronic purses are applications on the ACD's which hold programs and data including value data which is electronic cash. Electronic cash is transferred from purse to purse by coupling the respective ACD's electrically together via one or two interface devices (IFD's) and exchanging transaction messages. The messages take the form of commands issued by the IFD's and responses given by the purses. The responses include a value transfer message whereby a value record in the payer electronic purse is decremented by an amount and that in the payee electronic purse is incremented by the same amount. As was described in the above-mentioned international patent publications the electronic purses and transaction messages are secured by a public/secret key cryptographic system.

One form of IFD is a personal "wallet" which has two slots for accepting respective ACD's and controls transfer of funds between the electronic purses therein. FIG. 2 shows a wallet IFD 5 which has two smart cards 1c, 1d inserted. The IFD has a screen 6 and a keyboard 7. Internally the IFD has a microprocessor 8, RAM 9 and EEPROM 10. Within the RAM 9 are two buffers 11, 12. Each buffer is a portion of memory which retains the transaction messages after they are sent from the IFD respectively to the ACD's 1c and 1d. An alternative arrangement is to provide a single buffer which retains the last message sent, regardless of which ACD. The buffer or buffers may be in EEPROM instead of in RAM. FIG. 2 also shows the ACD's comprising microprocessors 13c, 13d; RAM 14c, 14d; and EEPROM 15c, 15d.

One example of a value transfer transaction is the loading of electronic cash into a customer's electronic purse from a bank such as bank 16 in FIG. 1. Here the IFD which couples the customer's ACD to the bank ACD is an automatic teller machine 17. Now the customer can purchase goods from a retailer by presenting his ACD to a point-of-sale POS terminal to which the retailer's ACD is also coupled. A transaction to transfer electronic cash value can be initiated. This is an off-line transaction as far as the bank is concerned. Retailers can deposit accumulated electronic cash to their own banks by further transactions, either at an automatic teller type IFD or by telephone as illustrated schematically in FIG. 3. Here the retailer's ACD 1a is coupled to an IFD 18 which is a combined card reader and modem. This is connected by telephone to an IFD 19 at the retailer's bank which again is a combined modem and card reader which is coupled to the bank's ACD 1b.

Figure 4:
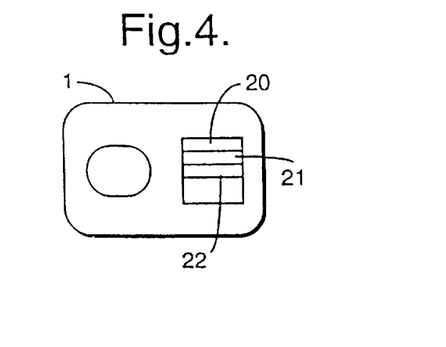
FIG. 4 is a diagram showing logs in an electronic purse of the system of FIG. 1.

FIG. 4 illustrates schematically part of the EEPROM 4 of an ACD which holds electronic purse data maintaining three records of a payment:

Details of the current or latest payment are held in a pending log record 20. When the payment has reached a critical point but is not yet complete, the payment is eligible for recovery. While details remain in the pending log record, the most recent payment protocol message that was sent out by the purse during this payment (if any) can be re-retrieved. This critical point occurs during the successful processing of either a Payment Start Payee command (in the payee's purse) or a Payment Request command (in the payer's purse). A payment held at this stage may be eligible for recovery. There is only one pending log record.

An exception log 21 stores details of payments that failed to complete successfully but can no longer be recovered. Entries in this log are never overwritten, but can be cleared out by a purse provider (e.g. a bank). Payments cannot be made when the exception log is full.

A payment log 22 keeps details of the latest successful payments. It is a circular log: when it is full, the oldest entry is overwritten with details of the new payment.

As soon as the balance in a purse changes, a payment log record is created. This happens during the handling of Payment Request (in the payer purse) or Payment Value (in the payee purse). In the case of the payer purse, at this stage the payment log record is marked as incomplete. (At the payee purse, the payment is now effectively complete, as no further messages are expected.)

Each transaction between electronic purses consists of a set of command transaction messages generated by the IFD and corresponding response transaction messages generated by the respective electronic purses. The electronic purse and IFD programs follow a predetermined command and response sequence. If the sequence is disturbed by a fault or interference of some kind then the transaction will be halted with a "message out of sequence" error.

A normal command and response sequence is now described.

The commands are described in three sets: pre-payment, payment start and payment protocol commands. The general technique is that pre-payment and payment start commands are issued which prepare for the payment, and these are followed by a minimal payment protocol message flow that should normally complete without failure and which only occurs when all pre-checking has been done.

Pre-payment Commands

Purse Register and Register Commands

These are issued by an IFD to obtain various items of information from the purse. The information includes the lengths of variable length data elements.

The Purse Register command provides the length of the Register command response and a memory write flag. The response to the Register command provides:

Configuration information about the Purse Application, such as how many pockets the purse contains, the capacity of the payment and exception logs, and the number of personal code tries permitted.

Current status information, indicating the number of unused exception log records, the current count of the number of consecutive incorrect personal code tries made, and the extent to which the internal memory is exhausted (expressed as a percentage).

A character set code, indicating the character set used for the purse narrative.

The Register command also indicates whether there is a previously attempted payment which failed to complete and which is eligible for recovery. This is discussed later.

Payment Register Command

This provides information that is to be supplied to the counterparty purse in the Payment Start command. The information can also be used by the IFD(s).

Payment start commands

There are two variants: Payment Start Payer and Payment Start Payee. The commands are similar, but only Payment Start Payee returns data in its response.

Payment Start Payer Command

This is directed to the payer's purse. It provides the purse with details of the payment to be made (direction, value and currency) and of the counterparty purse.

The purse then checks (not necessarily in this order) that:

There is a pocket for this currency, containing sufficient funds for the payment;

There is a free element in the exception log to hold details of the payment, if a failure occurs;

The two purses have different purse identifiers. (This should always be the case.);

The purse class of the payee is in this purse's class list;

The purse is not locked or locked out.

If these checks succeed, and there is a previously incomplete payment in the pending log, it is moved to the exception log. If the exception log is now full, the payment cannot proceed.

The command results in a status response. If all checks succeed, the details supplied are stored, and subsequent payment protocol commands must be based on the same information. The default currency for the purse is now the one announced for this payment.

The payer's purse is now expecting a Payment Request command.

Payment Start Payee

As for Payment Start Payer, this command provides the purse with details of the payment to be made (direction, value and currency) and of the counterparty purse.

The purse then checks (again, not necessarily in this order) that:

The purse can handle a payment in the currency indicated (it is a supported currency, and there is a pocket that can be used for the currency);

The payment will not cause the currency value limit to be exceeded;

There is a free element in the exception log to hold details of the payment, if a failure occurs;

The two purses have different purse identifiers. (This should always be the case.);

The purse is not locked out.

If these checks succeed, and there is a previously incomplete payment in the pending log, it is moved to the exception log. If the exception log is now full, the payment cannot proceed.

If all checks succeed, the details supplied are stored, and subsequent payment commands must be based on the same information. If appropriate a pocket is assigned to the specified currency and this becomes the default currency for the purse. The data in the response is a Payment Request signature that is used as the data for a Payment Request command to the payer purse.

Payment Protocol commands

The payment protocol commands comprise the three commands which transfer value from one purse to the other:

Payment Request, where the payee purse requests value;

Payment Value, where the payer purse sends the value;

Payment Ack, where the payee purse acknowledges the payment.

The sequence is implemented in a more complicated manner, because the purses do not communicate directly with each other but via an IFD (or multiple IFDS). It works as follows:

The data for Payment Request is obtained in response to a Payment Start Payee command sent to the payee purse. It is changed into a command, and sent as a Payment Request command to the payer purse;

The payer purse responds to the Payment Request command with a Payment Value message. This is sent as a Payment Value command to the payee purse;

The payee purse responds to the Payment Value command with a Payment Ack message. This is sent as a Payment Ack command to the payer purse.

The payer purse responds with status information.

Figure 5:
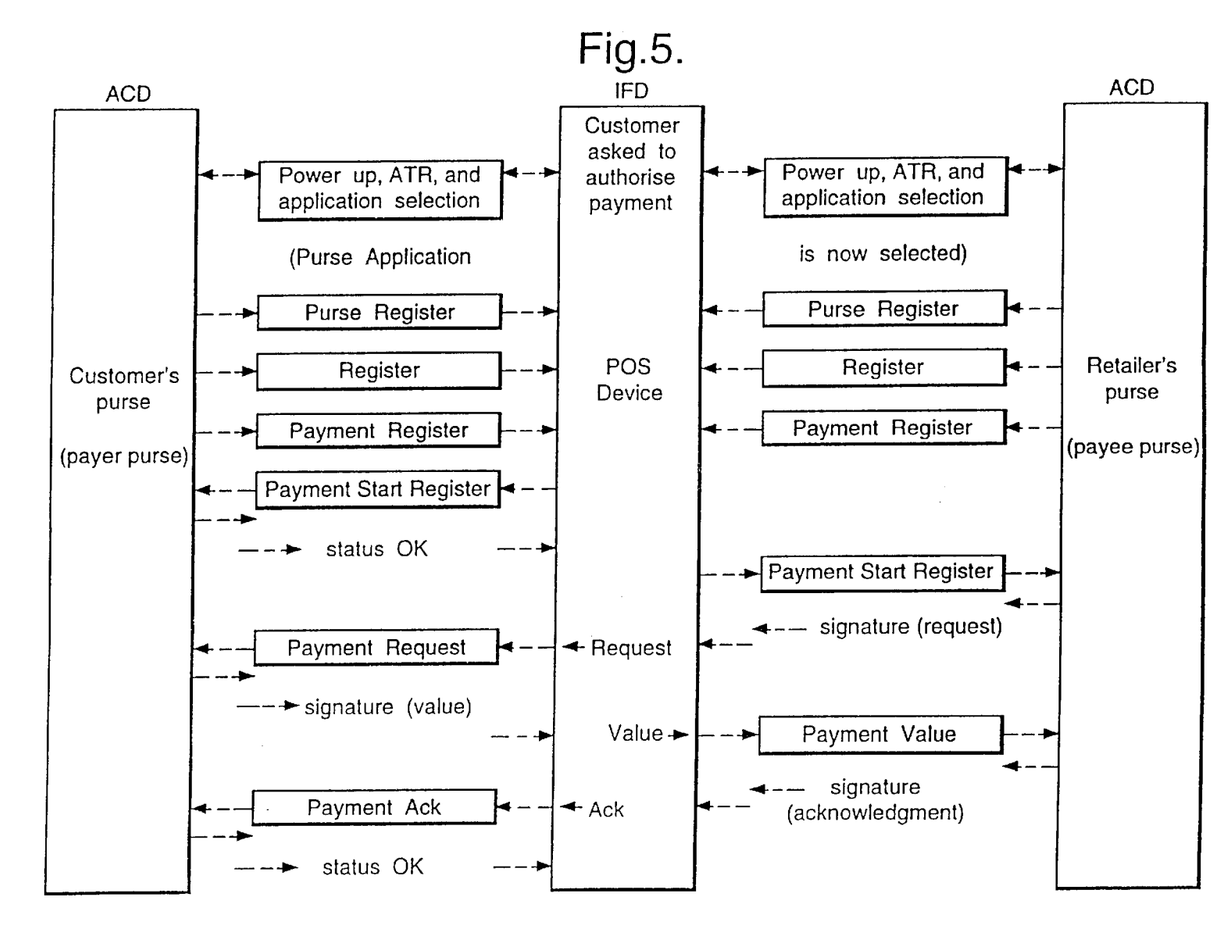
FIG. 5 is a diagram illustrating the flow of command and response transaction messages in a typical value transfer transaction at a point-of-sale terminal in the value transfer system.

The normal sequence of commands and responses in a payment transaction is shown in FIG. 5. In this Figure the text in boxes represents commands and the arrows indicate responses (data flow).

It is possible for a technical fault to manifest itself during a transaction. For example, a transaction message may be corrupted, the power supply may be broken or interrupted or an ACD may be removed from an IFD Some of the faults may be transient and others more substantial. The present invention provides ways of recovering interrupted transactions. Recovery may be either immediate (as soon as a fault is detected) or delayed (when purses are re-presented to IFDs after the payment has failed).

Within these types of recovery, there are two other possible ways for IFDs to operate a recovery:

Trial-and-error, or based on direct knowledge of the exact state the payment is in: the IFD(s) then simply continue with the payment (Trial-and-error applies if the fault occurs when a message has been sent to a purse and a response is not received. The IFD will not know whether the purse received and processed the message, and so its attempt to resend the message may result in an error message from the purse. In some cases, recovery may not be appropriate—the payment may already have completed successfully.);

Predetermined: where the IFD(s) investigate values returned from purses and can then determine which purse should be sent a Payment Resume command in order to recover the payment.

Where both purses are local to one IFD, trial-and-error recovery may be most appropriate, since the overhead of issuing the wrong command initially is not likely to be significant. In cases where two remote IFDs are involved, a trial-and-error approach may not be ideal, since it can be wasteful of messages across the communications link. Rather than using trial-and-error, IFDs can use the predetermined recovery method. Note that the predetermined recovery mechanism can be used whatever the circumstances (not just for remote recovery). There is also a need for users to be informed that a previous failure occurred, so that they can invoke recovery if appropriate.

The following illustrations are based on immediate recovery of payments where both purses are local to the IFD.

Figure 6:
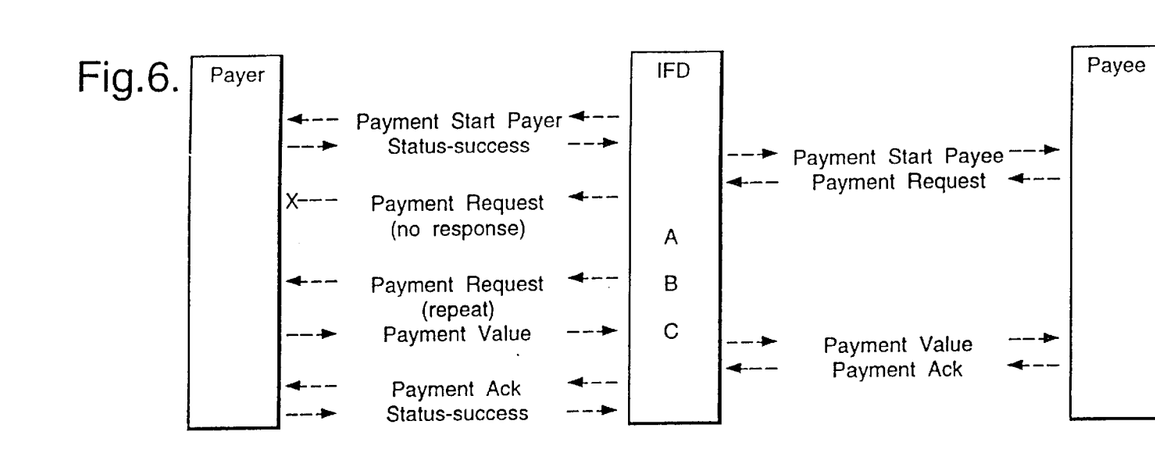
FIGS. 6 to 8 are diagrams showing the flow of command and response transaction messages in three respective examples of automatic and immediate implementation of the transaction recovery procedure in the value transfer system.

FIG. 6 shows a sequence where:

A. The IFD fails to receive a response to a Payment Request command sent to the Payer Purse.

B. The IFD sends the Payment Request to the Payer Purse again.

C. On the second attempt, the IFD receives a Payment Value message from the Payer Purse. (In this case the Payment Request had not previously been processed by the Payee Purse.)

In this example it is to be noted that the IFD retains in buffers transaction messages after they are sent. The buffers are illustrated in FIG. 2.

Figure 7:
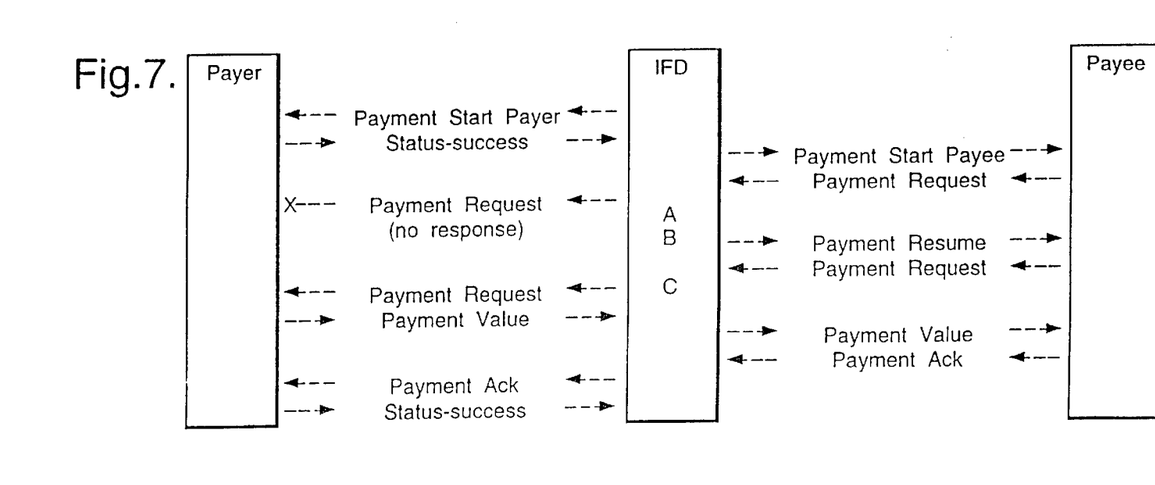

FIG. 7 shows a sequence where:

A. The IFD fails to receive a response to a Payment Request command sent to the Payer Purse.

B. In this case it has not retained the Payment Request message, and so sends Payment Resume to the Payee Purse to recover the Payment Request.

C. On sending Payment Request to the Payer Purse for the second time the Payer Purse successfully returns Payment Value. (As with FIG. 6, it succeeds because the Payer Purse had not received and processed the Payment Request on the first attempt.)

Figure 8:
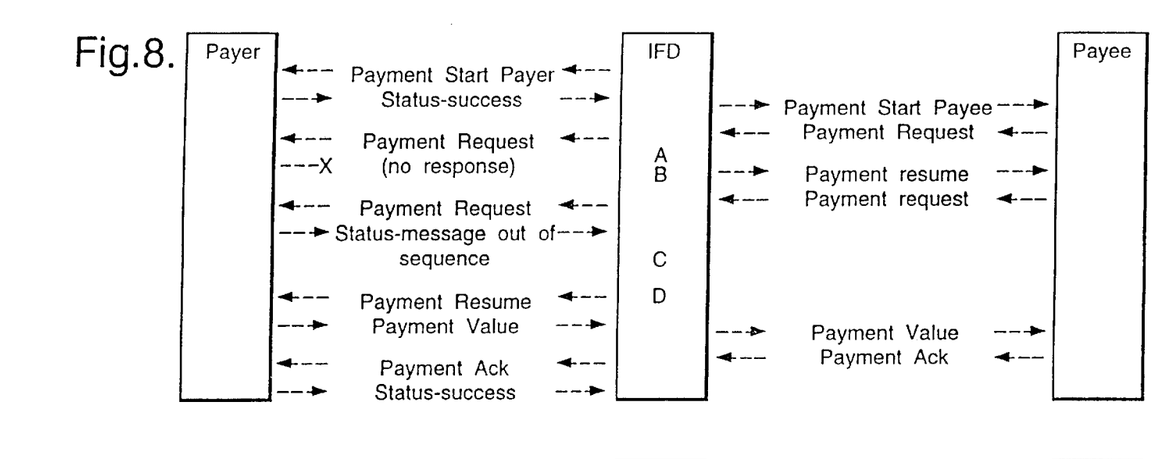

FIG. 8 shows a sequence where:

A. The IFD fails to receive a response to a Payment Request command sent to the Payer Purse.

B. It sends Payment Resume to the Payee Purse to recover the Payment Request message.

C. On sending Payment Request to the Payer for the second time the Payer Purse responds with "message out of sequence" because it had processed Payment Request previously.

D. The IFD then issues a Payment Resume to the Payer Purse to obtain the Payment Value message that it failed to receive the first time.

A further example, not shown, is where there is a recurring error on the interface between the IFD and a purse. For example, the IFD sends a Payment Value message to the Payee Purse and receives no valid response. It recovers the Payment Value from the Payer Purse, repeats the sequence for a predetermined number of times but with no more success, and then stops, advising the user of the failure.

Pre-determined recovery

Before describing how IFDs can recover a payment in a predetermined manner (rather than by trial and error), it is necessary to explain how a purse indicates to IFDs the stage it has reached in the payment.

The following recovery management data fields are used to indicate this:

a. Payment failure flag, in the Register response.
This may take the values:
no failure
payee purse failure (note that this does not necessarily indicate that a failure has occurred in the payee purse)
payer purse failure.

b. Pending exception flag, in the Register response.
This may take the values:
no pending exception
pending exception present.

c. Failed payment stage, in the Failed Payment Register response.

The values of this field are implementation dependent. However, IFDs may use this field to determined which purse has progressed further in a payment: the higher the value, the more progress a purse has made. There are four logical values, referred to here as V1, V2, V3 and V4, where $0<=V1<V2<V3<V4<=255$. Under some circumstances the purse will not return any of these values, but will respond to a Failed Payment Register command with the error "unable to payment resume".

Depending on these values, the IFD can predict whether Payment Resume will work, but cannot necessarily predict which payment message will be returned because it does not know the actual values associated with V1, V2, V3 and V4.

The following fields are also needed in order to check that this is the same pair of purses that were involved in the failed payment:

d. The counterparty Purse ID, from the Failed Payment Register response.

e. The counterparty sequence number, from the Failed Payment Register response.

Figure 9:
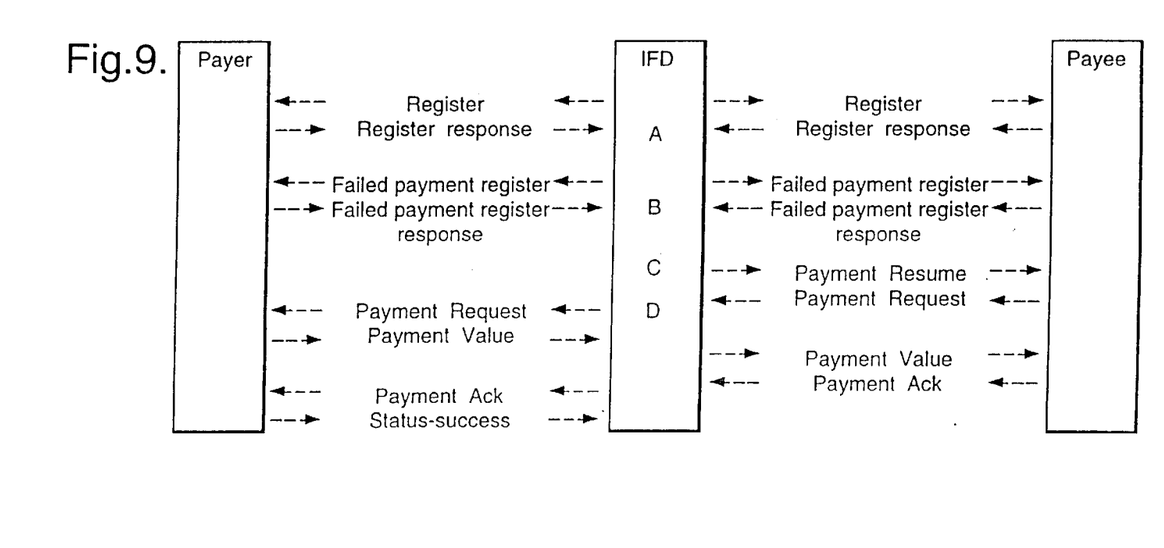
FIG. 9 is a diagram showing the flow of command and response transaction messages in implementation of a predetermined and delayed recovery procedure in the value transfer system.

FIG. 9 shows the sequence of commands and responses in a predetermined recovery procedure. The steps are:

A. Send a Register command to each purse, and inspect the payment failure flag in the response message. If one purse returns payer purse failure and the other returns payee purse failure, then recovery may be possible.

B. Send a Failed Payment Register command to each purse. If each response contains the PID of the other purse, and if the sequence numbers match, then recovery is possible.

C. Send Payment Resume to whichever purse reports the higher value of failed payment stage.

D. Turn the response from Payment Resume into a command to the other purse, and then continue with the payment.

It is to be understood that the predetermined recovery can be initiated during a failed transaction automatically on detection of a fault. Also, the checks and resumption of transaction if appropriate can be part of the normal transaction protocol. Thus, at the start of each transaction the purses are checked and if possible a pending transaction is completed before the next transaction is effected.

Figure 3:
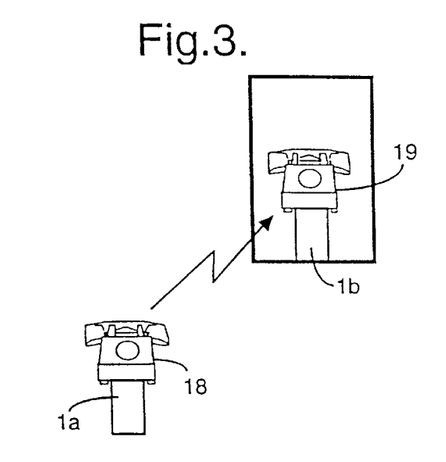
FIG. 3 is a diagram illustrating remote communication between electronic purses.

A special protocol is required when transactions take place remotely between electronic purses each having its own IFD, as illustrated in FIG. 3, for example. Here there are IFD-IFD message flows and a so-called Virtual ACD Protocol is used.

This protocol allows an IFD to send commands to a remote ACD via a remote IFD. Either IFD may do this. The IFD receiving such a command may either:

pass the command through to the ACD without inspection, or pass it to the ACD if it is acceptable, and interpret the message and any reply, or return an error ("message cannot be processed"), or re-interpret the command, and handle it as if it were an IFD-IFD message.

The IFD issuing the command is known as the "master", and the IFD receiving the command is referred to here as the "subsidiary". During value transfer, as discussed below, there is a convention that a value transfer involving two IFDs is initiated by an IFD—IFD Start Value Transfer command, and that following this command there is an understanding about which IFD is the "master" and which is the "subsidiary". However, an IFD may have to handle the case where a virtual ACD payment command is received outside this framework. (In theory, because of the full duplex link between IFDs, there could be an attempt to interleave two value transfers in opposite directions, so that each IFD was at the same time the master for one payment and subsidiary for the other. This may be allowable if different purses are involved.)

When performing remote value transfers, both of the IFDs must be able to determine the status of the payment transaction just performed. This is easy for the master to do, since it always knows what is happening throughout the value transfer. All IFDs always monitor for and prevent Payment Start Payer commands from being issued from a remote IFD. For the subsidiary IFD there are three options:

(1) To examine all messages before they are passed to the ACD, and all responses, so that at the end of a payment it can report exactly what occurred, or (2) To monitor Payment Start Payee commands: to reject all but the first such command following a Start Value Transfer command: and to read and compare all purse pocket values before and after the payment, so that payment details can be reported, or (3) To monitor Payment Start Payee commands; to allow each payment to continue; and to read and compare all purse pocket values before and after each payment (as for option (2)), so that payment details can be reported.

In options (2) and (3), the Payment Start Payee command data can be interpreted to determine the payment details, instead of comparing pocket values.

It is not considered adequate for the Payee's IFD to compare pocket values before and after a payment, and then to look at the last purse transaction log record to determine what has happened, since without identifying Payment Start Payee commands the IFD cannot reliably then determine the number of transactions that have occurred.

Monitoring all commands (the first option) can be said to protect the card holder to the maximum extent. For example, it can give the option of rejecting a payment which is not consistent with the preceding Start Value Transfer command; or can be used to prevent an unauthorised attempt to unlock a remote purse. However, options which do not rely on interpreting command headers, or data in Payment Start Payee commands, give the best future-proofing against system changes. (The subsidiary IFD need not be at the same system software release level as the master, but the IFDs can still inter-work.)

Figure 10:
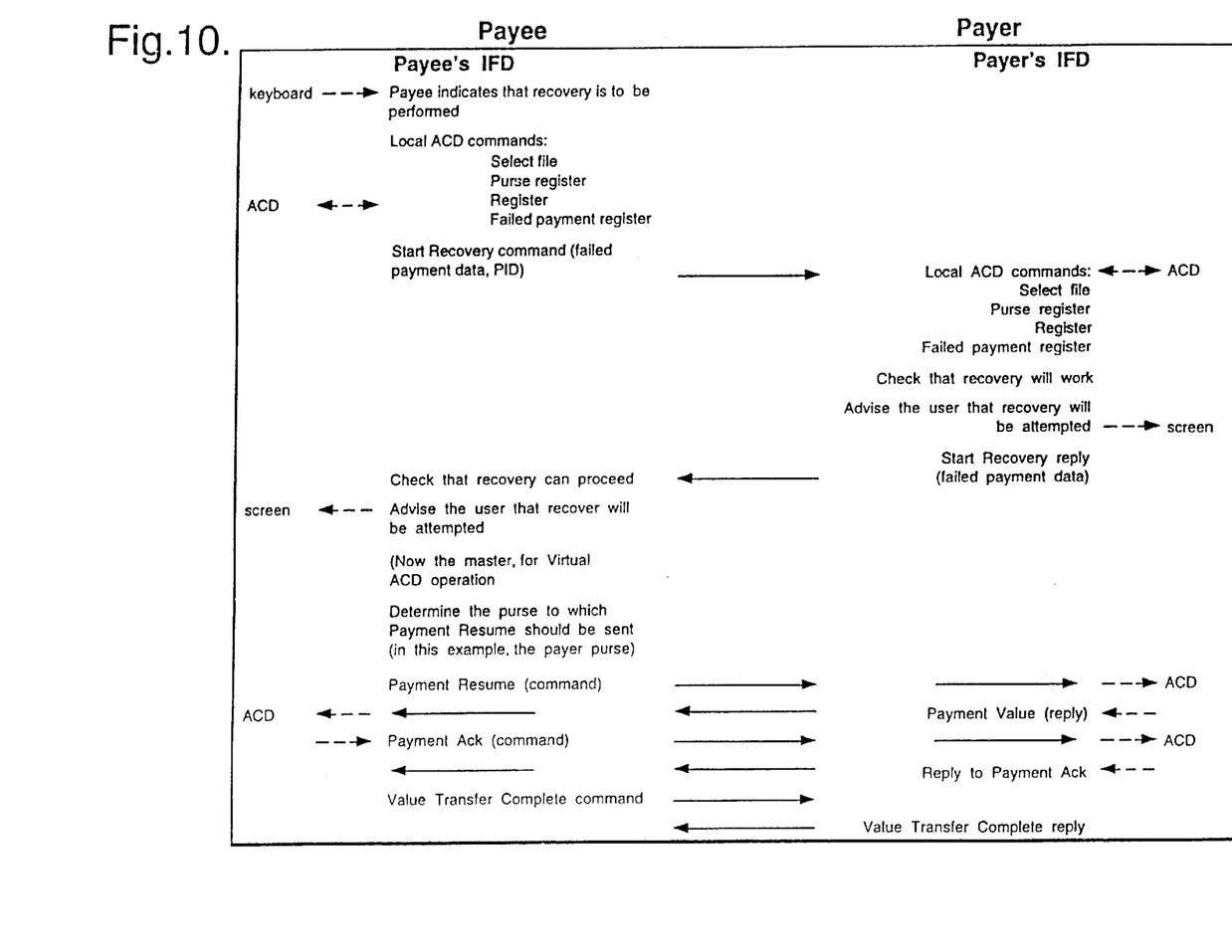
FIG. 10 is a diagram showing the flow of command and response transaction messages in implementation of a predetermined and delayed recovery procedure in the value transfer system.

FIG. 10 shows a typical message sequence involved in delayed recovery of a payment where the two purses that were involved in the original payment are now remote from each other.

The steps are as follows:

a. The users (payer and payee) agree to perform recovery, and ensure that the appropriate purses are available to their respective IFDs.

b. One of the users (in this example, the payee) asks his IFD to initiate the recovery.

c. The payee IFD issues appropriate local commands to its purse, including Register and Failed Payment Register. If payment failure flag from Register is "no failure", or if Failed Payment Register indicates "unable to payment resume", it tells the payee that recovery is impossible.

d. If all is well, the failed payment data and the Purse ID are sent in a Start Recovery command to the other IFD.

e. The payer IFD selects the appropriate purse according to the counterparty Purse ID specified in the failed payment data from Start Recovery command. Having found it, it issues appropriate local commands to its purse, including Register and Failed Payment Register. If either:

payment failure flag returned from Register indicates "no failure", or

Failed Payment Register indicates "unable to payment resume", or the Purse Ids and sequence numbers do not match, it tells the payer that recovery is impossible, and returns an error reply to the payee IFD.

f. If all is well, it returns the payer purse failed payment data in the Start Recovery response.

g. The payee IFD is now the master in the virtual ACD protocol. It compares the values of Failed Payment Stage as returned from the two purses, and sends a Payment Resume command to whichever purse reports the higher value of Failed payment stage. (In this example, it is the payer purse, and so Payment Resume is sent as a virtual ACD command.)

h. The payee IFD receives a response from Payment Resume, in this example a Payment Value message. It turns this into a Payment Value command which it sends to the payee purse. The payment then proceeds normally.

The use of the Start Recovery command might theoretically be dispensed with, and the initiating IFD might perform the recovery simply by using Virtual ACD commands. However:

The subsidiary IFD could not report the intention to recover, or the outcome of the recovery, to its user, as it would not know what was happening.

If the subsidiary IFD had more than one purse, the master would have no way of telling it which one to use.

What is claimed is:

1. A value transfer system comprising:

a plurality of electronic purses;

a plurality of application carrier devices (ACD's) for carrying the electronic purses;

a plurality of interface devices (IFD's) for coupling together pairs of ACD's to allow value transfer transactions to take place between pairs of electronic purses, wherein a transaction between a pair of electronic purses in ACD's coupled by an IFD comprises an exchange of transaction messages in a sequence according to a predetermined protocol, each transaction message being sent from one electronic purse of a pair to the IFD and from the IFD to the other electronic purse of the pair;

characterized in that each electronic purse includes:

storage means in the form of a pending log which holds details of the current or latest transaction;

recovery means effective to cause the IFD to invoke a recovery procedure if the predetermined sequence of transaction messages fails, said recovery means comprising means for interrogating one electronic purse of the pair to derive from its pending log the last transaction message which it sent and means for sending that transaction message to the other electronic purse of the pair to resume the transaction; and means for interrogating the other electronic purse of the pair to derive from its pending log the last transaction message which it sent, if the last transaction message of the one electronic purse results in an error when sent, to resume the transaction; and means for sending the last transaction message of the other electronic purse of the pair to the one electronic purse to resume the transaction.

2. The value transfer system as claimed in claim 1 wherein said recovery means further comprises:

means for interrogating both electronic purses of the pair to determine from their pending logs which electronic purse had progressed further in the failed transaction;

means for interrogating the electronic purse which had progressed further in the failed transaction to derive from its pending log the last transaction message which it sent; and means for sending that transaction message to the other electronic purse of the pair to resume the transaction.

3. The value transfer system as claimed in claim 1 wherein the IFD is effective to invoke the recovery procedure automatically and immediately during a transaction on detection of a failure in the predetermined sequence of transaction messages.

4. The value transfer system as claimed in claim 1 further comprising means effective to cause the IFD to interrogate the electronic pursed at the beginning of a proposed transaction to determine where there is a failed transaction pending between those purses which may be capable of resumption so that a delayed recovery procedure may be initiated.

5. The value transfer system as claimed in claim 1 wherein each electronic purse has an exception log which is a store of the details of failed transactions, the contents of the pending log being copied to a record in the exception log on failure to recover a failed transaction.

* * * * *